United States Patent
Kim et al.

(10) Patent No.: US 9,438,399 B2
(45) Date of Patent: Sep. 6, 2016

(54) METHOD FOR RECEIVING DOWNLINK CONTROL INFORMATION IN WIRELESS ACCESS SYSTEM AND TERMINAL THEREFOR

(75) Inventors: Jinmin Kim, Anyang-si (KR);
Seunghee Han, Anyang-si (KR);
Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 14/125,548

(22) PCT Filed: Jun. 15, 2012

(86) PCT No.: PCT/KR2012/004754
§ 371 (c)(1),
(2), (4) Date: Dec. 11, 2013

(87) PCT Pub. No.: WO2012/173432
PCT Pub. Date: Dec. 20, 2012

(65) Prior Publication Data
US 2014/0233470 A1    Aug. 21, 2014

Related U.S. Application Data

(60) Provisional application No. 61/497,080, filed on Jun. 15, 2011.

(51) Int. Cl.
| H04B 7/212 | (2006.01) |
| H04L 5/00 | (2006.01) |
| H04L 1/00 | (2006.01) |
| H04L 1/18 | (2006.01) |

(52) U.S. Cl.
CPC .......... H04L 5/0053 (2013.01); H04L 1/0046 (2013.01); H04L 1/1854 (2013.01)

(58) Field of Classification Search
CPC .......... H04L 27/2601; H04L 27/2608; H04L 5/001; H04L 5/0098
See application file for complete search history.

(56) References Cited

U.S. PATENT DOCUMENTS

2010/0279628 A1* 11/2010 Love et al. .................... 455/70

FOREIGN PATENT DOCUMENTS

| KR | 2009-0083269 | 8/2009 |
| KR | 2010-0053060 | 5/2010 |

(Continued)

OTHER PUBLICATIONS

Panasonic, "DCI format and blind decoding for LTE-Advanced," 3GPP TSG-RAN WG1 Meeting #59, R1-094497, Nov. 2009, 6 pages.

(Continued)

*Primary Examiner* — Alvin Zhu
(74) *Attorney, Agent, or Firm* — Lee, Hong, Degerman, Kang & Waimey; Jonathan Kang; Harry Lee

(57) ABSTRACT

The present invention relates to a method for receiving Downlink Control Information (DCI) in a wireless access system and a terminal therefor. More specifically, the method comprises the steps of: performing blind decoding according to the transmission mode set for a terminal in a search space assigned to the terminal; and receiving DCI through a detected Physical Downlink Control Channel (PDCCH) via blind decoding, wherein the transmission mode is set to any one of a plurality of transmission modes, which have limitations dependent on the performance of the terminal, by a base station that supports a plurality of transmission modes.

12 Claims, 8 Drawing Sheets

(56) References Cited

FOREIGN PATENT DOCUMENTS

| KR | 2011-0040672 | 4/2011 |
|---|---|---|
| WO | 2010/095913 | 8/2010 |
| WO | 2010/129606 | 11/2010 |
| WO | 2010/141611 | 12/2010 |

OTHER PUBLICATIONS

European Patent Office Application Serial No. 12800118.7, Search Report dated Mar. 3, 2015, 6 pages.
PCT International Application No. PCT/KR2012/004754, Written Opinion of the International Searching Authority dated Dec. 26, 2012, 14 pages.

* cited by examiner

METHOD FOR RECEIVING DOWNLINK CONTROL INFORMATION IN WIRELESS ACCESS SYSTEM AND TERMINAL THEREFOR

CROSS-REFERENCE TO RELATED APPLICATIONS

This application is the National Stage filing under 35 U.S.C. 371 of International Application No. PCT/KR2012/004754, filed on Jun. 15, 2012, which claims the benefit of U.S. Provisional Application Ser. No. 61/497,080, filed on Jun. 15, 2011, the contents of which are all hereby incorporated by reference herein in their entirety.

TECHNICAL FIELD

The present invention relates to a wireless access system, and more particularly, to a method of receiving a downlink control information in a wireless access system supportive of machine-type communication (MTC) and apparatus therefor.

BACKGROUND ART

In cellular communications, a user equipment existing in a cell accesses a base station to perform communication, receives control information for exchanging data from a base station, and then transceives data with the base station. In particular, since the user equipment transceives data through the base station, in order to transmit data to another cellular user equipment, the user equipment transmits its data to the base station. Having received the data, the base station transmits the received data to another user equipment. Thus, since data can be transmitted through the base station in order for one user equipment to transmit data to another user equipment, the base station performs scheduling of channels and resources for the data transceiving and also transmits channel and resource scheduling information to each user equipment. Thus, in order to perform UE-to-UE communication through the base station, each user equipment needs channel and resource allocations to transceive data with the base station. Yet, according to the structure of D2D communication, one user equipment directly transceives signals with another user equipment, to which data shall be transmitted, without using a base station or a relay node.

DISCLOSURE OF THE INVENTION

Technical Tasks

One object of the present invention is to provide a method of smoothly transceiving a downlink control information between a user equipment and a base station in a wireless access system supportive of machine-type communication (MTC) and apparatus therefor.

Another object of the present invention is to provide a method of reducing a blind decoding count and apparatus therefor, by which a downlink control information can be smoothly received in a user equipment implemented with low costs or low performance.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving a downlink control information (DCI) in a wireless access system, according to one embodiment of the present invention includes the steps of performing a blind decoding in accordance with a transmission mode set for a user equipment in a search space assigned to the user equipment and receiving the DCI through a PDCCH (physical downlink control channel) found by the blind decoding, wherein the transmission mode is set to one of a plurality of transmission modes restricted in accordance with a performance of the user equipment among a plurality of transmission modes supported by a base station.

To further achieve these and other advantages and in accordance with the purpose of the present invention, as embodied and broadly described, a user equipment, which receives a downlink control information (DCI) in a wireless access system, according to another embodiment of the present invention includes an RF unit configured to transceive radio signals and a processor performing a blind decoding in accordance with a transmission mode set for the user equipment in a search space assigned to the user equipment, the processor receiving the DCI through a PDCCH (physical downlink control channel) found by the blind decoding, wherein the transmission mode is set to one of a plurality of transmission modes restricted in accordance with a performance of the user equipment among a plurality of transmission modes supported by a base station.

Preferably, the blind decoding is performed using a format of the DCI in accordance with a resource allocation type set for the user equipment and the resource allocation type is set to one of a plurality of resource allocation types supported by the base station in accordance with the performance of the user equipment.

Preferably, the search space is set to either a UE-specific (user equipment-specific) search space or a common search space in accordance with the performance of the user equipment.

Preferably, the DCI is transmitted per format of the DCI in either a UE-specific (user equipment-specific) search space or a common search space.

Preferably, the blind decoding is performed only using formats of a plurality of DCIs restricted in accordance with the performance of the user equipment among formats of a plurality of DCIs supported by the base station.

Preferably, the blind decoding is performed using a CCE aggregation level restricted in accordance with the performance of the user equipment among a plurality of control channel element (CCE) aggregation levels supported by the base station and wherein the CCE is a basic unit for transmission of the PDCCH.

Preferably, the blind decoding is performed through candidates restricted in accordance with the performance of the user equipment among a plurality of candidates of the PDCCH configuring the search space.

Advantageous Effects

According to an embodiment of the present invention, a downlink control information can be smoothly transceived between a user equipment and a base station in a wireless access system, and more particularly, in a machine-type communication (MTC) supportive wireless access system.

According to an embodiment of the present invention, restrictions are put on the existing settings to transceive a downlink control system depending on performance of a user equipment. Therefore, the present invention reduces a blind decoding count and implements a user equipment with low costs.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
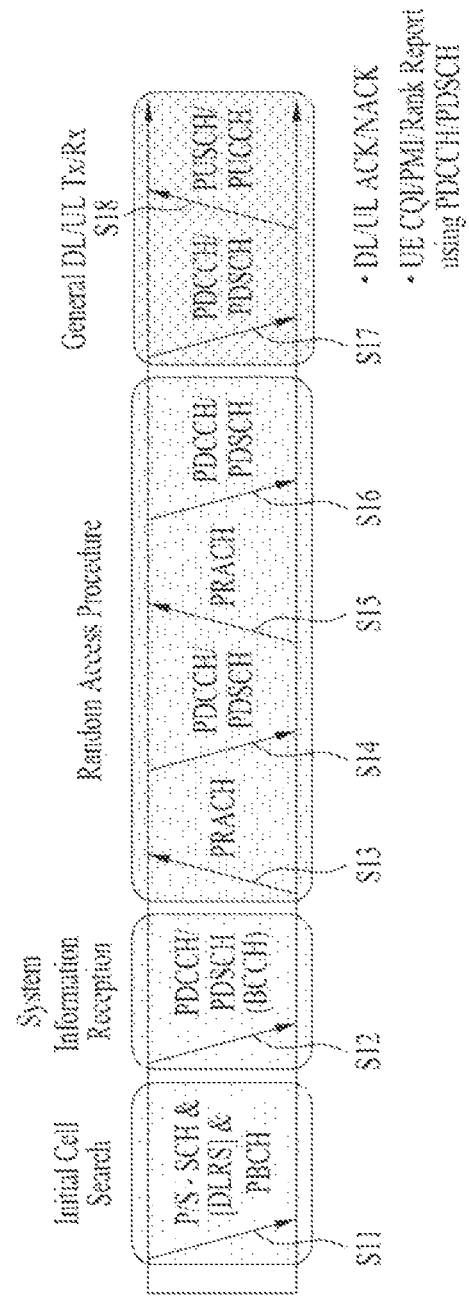
FIG. 1 is a diagram for explaining physical channels used for 3GPP system and a general signal transmitting method using the same.

Reference will now be made in detail to the preferred embodiments of the present invention, examples of which are illustrated in the accompanying drawings. The following detailed description with reference to the accompanying drawings intends to describe exemplary embodiments of the present invention rather than to represent a unique embodiment of the present invention. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable 1. 1. The General of System FIG. 1 is a diagram for explaining physical channels used for 3GPP system and a general signal transmitting method using the same.

First of all, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain detailed system information [S12].

Thereafter, the user equipment may perform a random access procedure to complete the access to the base station [S13 to S16]. To this end, the user equipment may transmit a specific sequence as a preamble via a physical random access channel (PRACH) [S13] and may then receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be aperiodically transmitted in response to a request/indication made by a network.

Figure 2:
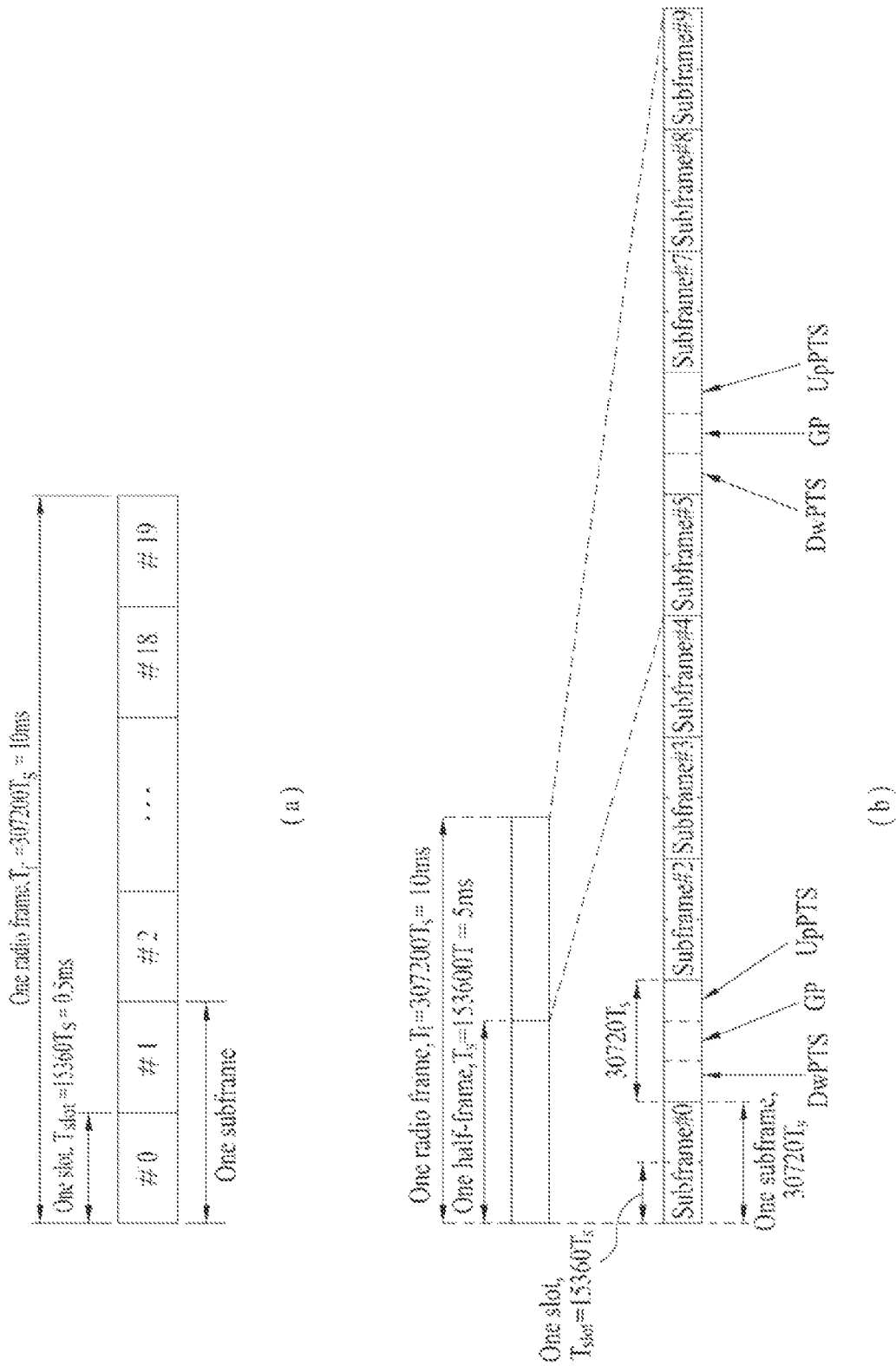
FIG. 2 is a diagram for a structure of a radio frame in 3GPP LTE.

FIG. 2 shows structures of radio frames in 3GPP LTE.

FIG. 2 (a) shows a frame structure type 1. This frame structure type 1 may be applicable to both a full duplex FDD (frequency division duplex) system and a half duplex FDD system.

One radio frame has a length of '$T_f$=307200·$T_s$=10 ms' and is constructed with 20 slots to which indexes 0 to 19 are respectively given with an equal length of '$T_{slot}$=15360·$T_s$=0.5 ms'. One subframe is defined as two contiguous slots. For example, an $i^{th}$ subframe is constructed with a slot corresponding to '2i' and a slot corresponding to '2i+1'. In particular, a radio frame includes 10 subframes. And, a time taken to transmit one subframe is called a transmission time interval (hereinafter abbreviated TTI). In this case, Ts indicates a sampling time and may be represented as 'Ts=1/(15 kHz×2048)=3.2552×10$^{-8}$ (i.e., about 33 ns)'. One slot may include a plurality of OFDM or SC-FDMA symbols in time domain and may include a plurality of resource blocks (RBs) in frequency domain.

One slot includes a plurality of OFDM (orthogonal frequency division multiplexing) symbols in time domain. Since 3GPP uses OFDMA in downlink, OFDM symbol is provided to indicate one symbol period. The OFDM symbol may be named one SC-FDMA symbol or symbol period. Resource block (RB) is a resource allocation unit and may include a plurality of contiguous subcarriers in one slot.

In the full duplex FDD system, 10 subframes are simultaneously usable for DL and UL transmissions in each 10 ms interval. In doing so, the UL transmission and the DL transmission are separated from each other in frequency domain. On the contrary, in the half duplex FDD system, a user equipment is unable to perform a transmission and a reception at the same time.

The above-described structure of the radio frame is one example only. And, the number of subframes included in a radio frame, the number of slots included in the subframe and the number of symbols included in the slot may be modified in various ways.

FIG. 2 (b) shows a frame structure type 2. The frame structure type 2 is applicable to the TDD system. One radio frame has a length of '$T_f$=307200·$T_s$=10 ms' and is constructed with 2 half-frames each of which has a length of '15360·$T_s$=0.5 ms'. Each of the half-frames is constructed with 5 subframes each of which has a length of '30720·$T_s$=1 ms'. For example, an $i^{th}$ subframe is constructed with a slot corresponding to '2i' and a slot corresponding to '2i+1', each of which has a length of '$T_{slot}$=15360·$T_s$=0.5 ms'. In this case, Ts indicates a sampling time and may be represented as 'Ts=1/(15 kHz×2048)=3.2552×10$^{-8}$ (i.e., about 33 ns)'.

The type 2 frame includes a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

Table 1 shows a configuration (length of DwPTS/GP/UpPTS) of a special frame.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |

TABLE 1-continued

| | Normal cyclic prefix in downlink | | | Extended cyclic prefix in downlink | | |
|---|---|---|---|---|---|---|
| | | UpPTS | | | UpPTS | |
| | | Normal | Extended | | Normal | Extended |
| Special subframe configuration | DwPTS | cyclic prefix in uplink | cyclic prefix in uplink | DwPTS | cyclic prefix in uplink | cyclic prefix in uplink |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
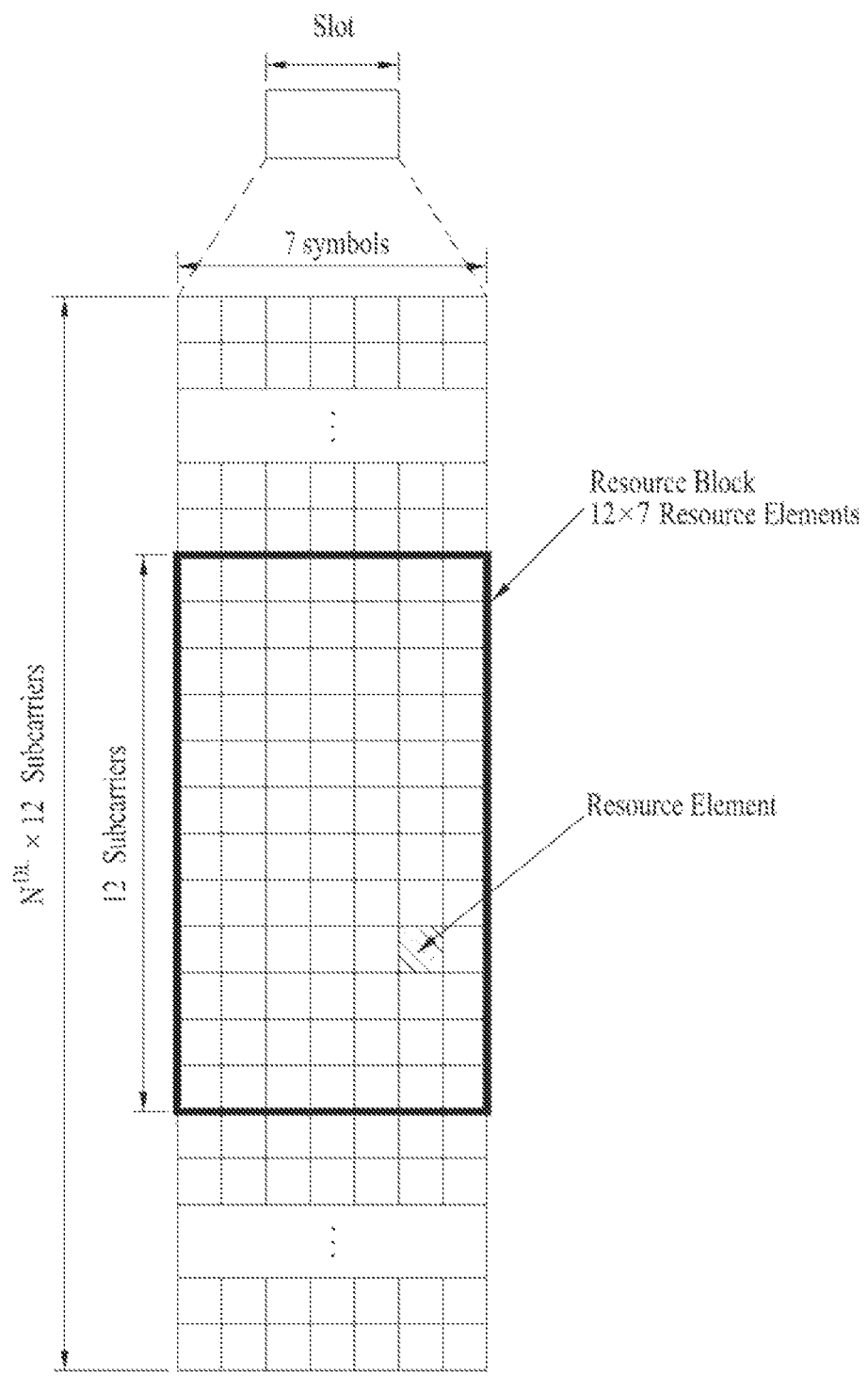
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
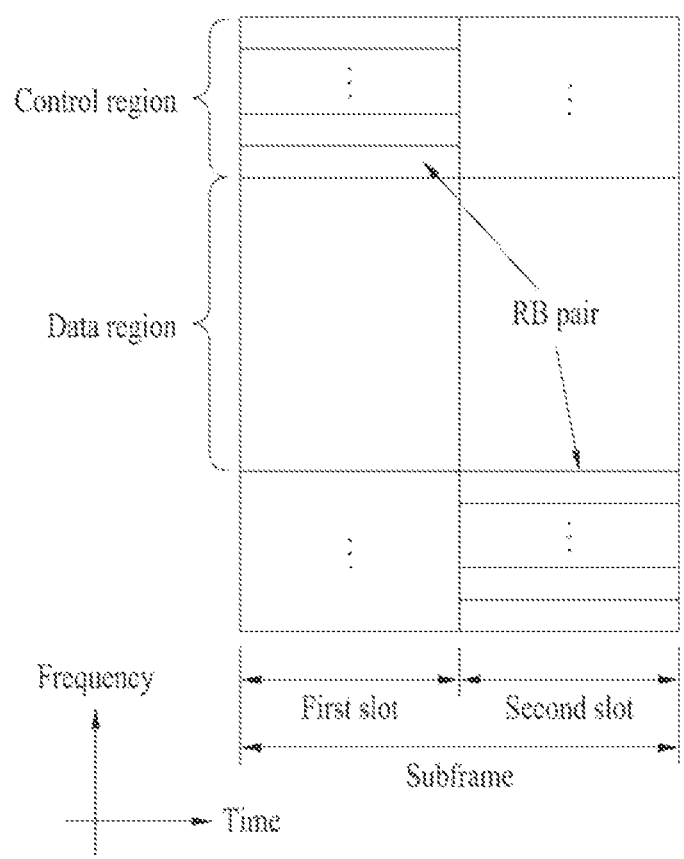
FIG. 4 is a diagram for a structure of an uplink subframe.

FIG. 4 is a diagram for a structure of an uplink (UL) subframe.

Referring to FIG. 4, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 5:
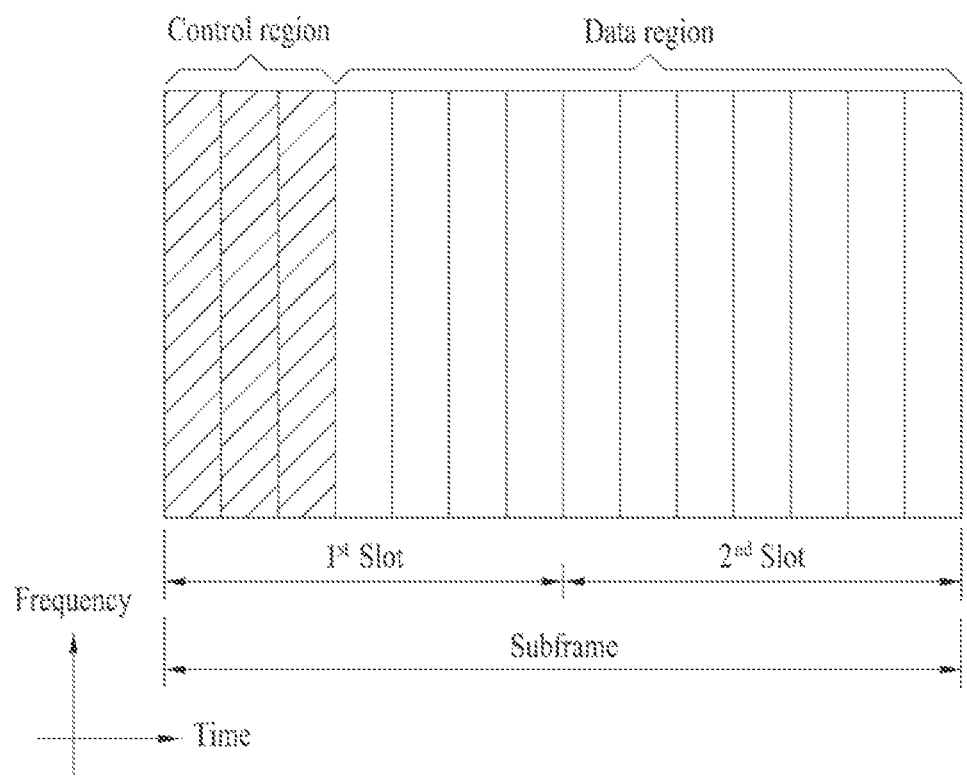
FIG. 5 is a diagram for a structure of a downlink subframe.

FIG. 5 is a diagram for a structure of a downlink (DL) subframe.

Referring to FIG. 5, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

1. 2. PDCCH (Physical Downlink Control Channel)

1. 2. 1. The General of PDCCH

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). The PDCCH configured with the aggregation of the at least one or more contiguous CCEs undergoes sub-block interleaving and may be then transmitted via the control region. CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

1. 2. 2. PDCCH Structure

A plurality of PDCCHs multiplexed for a plurality of user equipments can be transmitted in a control region. PDCCH is configured with one CCE or the aggregation of at least 2 contiguous CCEs [CCE aggregation]. In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG. In particular, the total number of REGs in OFDM symbol may vary by depending on whether a cell-specific reference signal exists. The concept of REG for mapping 4 resource elements to one group may apply to other DL control channels (e.g., PCFICH, PHICH, etc.). Assuming that REG not assigned to PCFICH or PHICH is set to $N_{REG}$, the number of CCEs available for a system is represented as '$N_{CCE} = \lfloor N_{REG}/9 \rfloor$' and indexes 0 to '$N_{CCE}-1$' are given to the CCEs in order, respectively.

In order to simplify a decoding processor of a user equipment, PDCCH format including n CCEs may start with CCE having an index equal to the multiple of n. In particular, if a CCE index is i, the PDCCH format may start with the CCE that satisfies the equation 'i mod n=0'.

In order to configure a single PDCCH signal, a base station may be able to use CCEs, of which number belongs to {1, 2, 4, 8}. In this case, {1, 2, 4, 8} is called a CCE aggregation level. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

Table 2 shows PDCCH format, in which 4 kinds of PDCCH formats are supported in accordance with CCE aggregation levels.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

User equipments differ from each other in CCE aggregation level. This is because a format or MCS (modulation and coding scheme) level of control information carried on PDCCH is different. In this case, the MCS level means a code rate used for data coding and a modulation order. An adaptive MCS level is used for a link adaptation. Generally, in a control channel for transmitting control information, 3 or 4 MCS levels may be taken into consideration.

In the following description, PDCCH is explained in detail. First of all, control information carried on PDCCH may be called downlink control information (DCI). A configuration of information loaded on PDCCH payload may vary in accordance with DCI format. In this case, the PDCCH payload may mean information bit(s). Table 3 shows DCI in accordance with DCI format.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 3, DCI formats may include a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in closed-loop spatial multiplexing mode, a format 2A for PDSCH scheduling in open-loop spatial multiplexing mode, a format 3 for a transmission of a TPC (transmission power control) command for a UL channel, and a format 3A for a transmission of a TPC (transmission power control) command for a UL channel. Moreover, a DCI format 1A is usable for PDSCH scheduling despite that any kind of transmission mode is set for a user equipment.

A PDCCH payload length may vary in accordance with DCI format. A PDCCH payload type and a length thereof may vary in accordance with a presence or non-presence of a compact scheduling, a transmission mode configured for a user equipment, or the like.

The transmission mode may be configured in order for a user equipment to receive DL data on PDSCH. For instance, the DL data on PDSCH may include scheduled data for a user equipment, paging, random access response, broadcast information via BCCH and the like. The DL data on PDSCH is related to the DCI format signaled via PDCCH. The transmission mode may be semi-statically configured by an upper layer signaling (e.g., RRC (radio resource control) signaling, etc.). The transmission mode may be categorized into a single antenna transmission and a multi-antenna transmission. A transmission mode is semi-statically configured for a user equipment by the upper layer signaling. For instance, the multi-antenna transmission may include transmit diversity, open-loop spatial multiplexing, closed-loop spatial multiplexing, MU-MIMO (multiuser-multiple input multiple output), beamforming or the like. The transmit diversity is the technology of raising transmission reliability by transmitting the same data via multiple transmitting antennas. The spatial multiplexing is the technology of transmitting high-speed data without increasing a bandwidth of a system by simultaneously transmitting different data via multiple transmitting antennas. The beamforming is the technology of increasing SNR (signal to interference plus noise ratio) by adding a weight in accordance with a channel state at multi-antenna.

DCI format depends on a transmission mode configured in a user equipment. The user equipment has a reference DCI format of monitoring in a transmission mode configured on its own. The transmission mode configured in the user equipment may correspond to one of 7 transmission modes as follows:

(1) Single antenna port: Port 0
(2) Transmit diversity
(3) Open-loop spatial multiplexing
(4) Closed-loop spatial multiplexing
(5) Multi-user MIMO
(6) Closed-loop rank=1 precoding
(7) Single antenna port: Port 5

1. 2. 3. PDCCH Transmission

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Subsequently, the base station creates coded data by performing channel coding on the CRC attached control information. In doing so, the channel coding may be performed at a code rate in accordance with an MCS level. The base station performs a rate matching in accordance with a CCE aggregation level assigned to PDCCH format and then generates modulated symbols by modulating the coded data. In doing so, it may be able to use a modulation sequence in accordance with an MCS level. The modulated symbols configuring one PDCCH may have a CCE aggregation level set to one of 1, 2, 4 and 8. Thereafter, the base station maps the modulated symbols to physical resource elements [CCE to RE mapping].

1. 2. 4. Blind Decoding

A plurality of PDCCHs can be transmitted in a single subframe. In particular, a control region of one subframe is configured with a plurality of CCEs having indexes set to 0 to ($N_{CCE,k}$−1). In particular, the $N_{CCE,k}$ means the total number of CCEs in a control region of $k^{th}$ subframe. A user equipment monitors a plurality of PDCCHs in each subframe. In this case, the verb 'monitor' means that the user equipment attempts decoding of each of the PDCCHs in accordance with a monitored PDCCH format. In a control region assigned within a subframe, a base station does not provide information indicating where a PDCCH corresponding to the user equipment is located. In order to receive a control channel transmitted from the base station, since the user equipment is unable to know that its PDCCH is transmitted in a specific DCI format or on a specific CCE aggregation level at a specific position, the user equipment finds its PDCCH by monitoring an aggregation of PDCCH candidates in a subframe. This is called a blind decoding/detection (BD). According to the blind decoding, a user equipment takes its UE ID (user equipment identifier) from a CRC part by demasking and then confirms whether the corresponding PDCCH is a control channel of the user equipment by checking CRC error.

In active mode, a user equipment monitors PDCCH of every subframe to receive data transmitted to it. In DRX mode, a user equipment wakes up in a monitoring interval of each DRX period and then monitors PDCCH in a subframe corresponding to the monitoring interval. In doing so, a subframe for monitoring PDCCH is called a non-DRX subframe.

The user equipment should perform blind decoding on all CCEs existing in a control region of the non-DRX subframe on order to receive PDCCH transmitted to the user equipment. Since the user equipment does not know which PDCCH format will be received, it should decode all PDCCHs on possible CCE aggregation levels in every non-DRX subframe until succeeding in the blind decoding of PDCCHs. Moreover, since the user equipment does not know how many CCEs will be used by the PDCCH for the user equipment, the user equipment should attempt detection on all possible CCE aggregation levels until succeeding in the blind decoding of PDCCH. In particular, the user equipment performs blind decoding by CCE aggregation levels. In particular, the user equipment attempts the decoding by setting a CCE aggregation level unit to 1. If the user equipment fails in all decoding, it attempts the decoding by setting the CCE aggregation level unit to 2. Thereafter, the user equipment attempts the decoding in a manner of setting the CCE aggregation level unit to 4 and 8 in turn. The user equipment attempts blind decoding on 4 identifiers including C-RNTI, P-RNTI, SI-RNTI and RA-RNTI. And, the user equipment attempts the blind decoding on all DCI formats that should be monitored.

Thus, if the user equipment attempts the blind decoding on all possible RNTIs and all DCI formats necessary to be monitored by all CCE aggregation levels, the count of the detection attempts excessively increases. Hence, in LTE system, a concept of a search space (SS) is defined for a blind decoding performed by a user equipment. The search space means a PDCCH candidate set to be monitored and may have a size different in accordance with each PDCCH format.

The search space may be configured with a common search space (CSS) and a UE-specific/dedicated search space (USS). In case of the common search space, all user equipments may be able to know a size of the common search space. On the other hand, the UE-specific search space may be individually set for each user equipment. Hence, a user equipment should monitor both of the UE-specific search space and the common search space to decode PDCCH, thereby performing the blind decoding (BD) in a single frame 44 times to the maximum. In doing so, the blind decoding performed in accordance with a different CRC value (e.g., C-RNTI, P-RNTI, SI-RNTI, RA-RNTI) is not included.

Due to a small search space, it may happen that a base station is unable to reserve CCE resources enough to transmit PDCCH to all user equipments attempting to transmit PDCCH in a given subframe. This is because resources remaining after assignment of CCE positions may not be included in a search space of a specific user equipment. In order to minimize this barrier that may be kept in a next subframe, a UE-specific hopping sequence may apply to a start point of the UE-specific search space.

Table 4 shows sizes of a common search space and a UE-specific search space.

TABLE 4

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In order to reduce a calculation load of a user equipment due to a blind decoding attempt count, a user equipment does not perform searches in accordance with all the defined DCI formats at the same time. In particular, the user equipment always searches a UE-search space for DCI format 0 and DCI format 1A. In doing so, although the DCI format 0 and the DCI format 1A are equal to each other in size, the user equipment is able to identify DCI formats using flags used to identify the DCI format 0 and the DCI format 1A included in PDCCH [Flags for format 0/format 1A differentiation]. Moreover, DCI formats other than the DCI format 0 or the DCI format 1A may be requested to the user equipment. For example, the requested DCI formats may include DCI format 1, DCI format 1B and DCI format 2.

A user equipment may be able to search a common search space for DCI format 1A and DCI format 1C. Moreover, the user equipment may be set to search for DCI format 3 or DCI format 3A. In this case, although the DCI format 3/A may have the same size of the DCI format 0/1A, the user equipment may be able to identify a DCI format using CRC scrambled by an identifier other than a UE-specific identifier.

Search space $S_k^{(L)}$ means a PDCCH candidate set in accordance with an aggregation level $L \in \{1,2,4,8\}$. CCE in accordance with a PDCCH candidate set m of the search space may be determined by Formula 1.

$$L \cdot \{(Y_k+m) \bmod \lfloor N_{CCE,k}/L \rfloor\}+i \qquad \text{[Formula 1]}$$

In Formula 1, $M^{(L)}$ indicates the number of PDCCH candidates in accordance with a CCE aggregation level L to be monitored in a search space, where m=0, . . . , $M^{(L)}-1$. The i is an index for designating an individual CCE in each PDCCH candidate in PDCCH and may be represented as 'i=0, . . . L-1'.

In order to decode PDCCH, as mentioned in the foregoing description, a user equipment monitors both a UE-specific search space and a common search space. In this case, the common search space (CSS) supports PDCCHs having the aggregation level of {4, 8}, while the UE-specific search space (USS) supports PDCCHs having the aggregation level of {1, 2, 4, 8}. Table 6 shows PDCCH candidates monitored by a user equipment.

TABLE 5

| Type | Search space $S_k^{(L)}$ Aggregation level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to Formula 1, in case of a common search space, for two aggregation levels, L=4 and L=8, $Y_k$ is set to 0. On the contrary, in case of a UE-specific search space, for an aggregation level L, $Y_k$ is defined as Formula 2.

$$Y_k=(A \cdot Y_{k-1}) \bmod D \qquad \text{[Formula 2]}$$

In Formula 2, it is $Y_{-1}=n_{RNTI} \neq 0$ and a value of RNTI used for $n_{RNTI}$ can be determined as one of identifications of a user equipment. Moreover, A=39827, D=65537, and k=$\lfloor n_s/2 \rfloor$. In this case, the $n_s$ indicates a slot number (or index) in a radio frame.

1. 2. 5. PDCCH Validation for Semi-Persistent Scheduling

Semi-persistent scheduling (hereinafter abbreviated SPS) is a scheme of scheduling for allocating a resource to a user equipment in a manner that the resource is persistently maintained during a specific time interval. In case that a predetermined amount of data is transmitted in a specific time like VoIP (voice over internet protocol), it is not necessary to transmit control information in each data transmission interval for the resource allocation. Hence, it is able to reduce the waste of the control information using the SPS scheme. According to a so-called semi-persistent scheduling (SPS) method, a time resource region for allocating a resource is preferentially to a user equipment. In doing so, according to a semi-persistent allocating method, a time resource region allocated to a specific user equipment can be set to have periodicity. Subsequently, the allocation of time-frequency resources is completed by allocating a frequency resource region if necessary. Thus, the allocation of the frequency resource region may be called 'activation'. If the semi-persistent allocating method is used, since the resource allocation is maintained for a predetermined period by a single signaling, it is unnecessary to perform the resource allocation repeatedly. Therefore, it is able to reduce signaling overhead. Thereafter, if the resource allocation to the user equipment becomes unnecessary, a base station can transmit a signaling for releasing the frequency resource allocation to the user equipment. Thus, releasing the allocation of the frequency resource region can be called a so-called deactivation.

Currently, for an SPS for UL and/or DL, in LTE, a user equipment is informed that an SPS transmission/reception should be performed in specific subframes through an RRC (radio resource control) signaling. In particular, a time resource in the time-frequency resources allocated for the SPS is preferentially designated through the RRC signaling. In order to indicate an available subframe, periodicity and offset of the subframe can be indicated for example. Yet, since a time resource region is allocated to the user equipment through the RRC signaling, even if the user equipment receives the RRC signaling, the user equipment does not perform the transmission/reception by the SPS in direct. Instead, the user equipment completes the allocation of the time-frequency resources by allocating a frequency resource region if necessary. Thus, allocating the frequency resource region may be named an activation. And, releasing the allocation of the frequency resource region may be named a deactivation.

Accordingly, having received PDCCH indicating the activation, the user equipment allocates a frequency resource in accordant with RB allocation information included in the received PDCCH and then starts to perform transmission/reception in accordance with the subframe periodicity and offset assigned through the RRC signaling by applying a modulation and code rate in accordance with MCS (modulation and coding scheme) information. Subsequently, if the user equipment receives PDCCH indicating the deactivation from the base station, the user equipment stops the transmission/reception. After the transmission/reception has been stopped, if the user equipment receives the PDCCH indicating the activation or the deactivation, the user equipment resumes the transmission/reception with the subframe periodicity and offset assigned by the RRC signaling using RB allocation designated by the received PDCCH, MCS designated by the received PDCCH and the like. In particular, although the allocation of time resource is performed through the RRC signaling, a signal transmission/reception can be actually performed after receiving the PDCCH indicating the activation/deactivation of SPS and an interruption of the signal transmission/reception is performed after receiving the PDCCH indicating the deactivation of the SPS.

A user equipment can confirm PDCCH including an SPS indication if all the following conditions are met. First of all, CRC parity bit added for a PDCCH payload should be scrambled with SPS C-RNTI. Secondly, a new data indicator (NDI) field should be set to 0. In doing so, in case of DCI formats 2, 2A, 2B and 2C, the new data indicator field indicates one of activated transmission blocks.

Subsequently, if each field used for a DCI format is set in accordance with Table 6 and Table 7 in the following, the confirmation is complete. Once such a confirmation is complete, the user equipment recognizes the received DCI information as a valid SPS activation or deactivation (or release). On the contrary, if the confirmation is not complete, the user equipment recognizes that a non-matching CRC is included in the received DCI format.

Table 6 shows fields for the confirmation of PDCCH indicating SPS activation.

TABLE 6

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 7 shows fields for the confirmation of PDCCH indicating SPS deactivation (or release).

TABLE 7

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

In case that DCI format indicates SPS DL scheduling activation, a TPC command value for PUCCH field can be used as an index indicating 4 PUCCH resource values set by a higher layer. The mapping relationship between the TPC command value and the PUCCH resource value is shown in Table 8.

Table 8 shows PUCCH resource values for DL SPS scheduling.

TABLE 8

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

2. Carrier Aggregation Environment 2. 1. The General of Carrier Aggregation

Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

Serving cell (e.g., PCell, SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has a value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of an upper layer, which contains mobility control information (mobilityControlInfo).

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of an upper layer. E-UTRAN may perform a dedicated signaling having a parameter differing per user equipment rather than a broadcasting in a related SCell.

After an initial security activating process has started, E-UTRAMN may be able to configure a network including at least one SCell in addition to PCell configured in the early stage of a connection establishment process. In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

Figure 6:
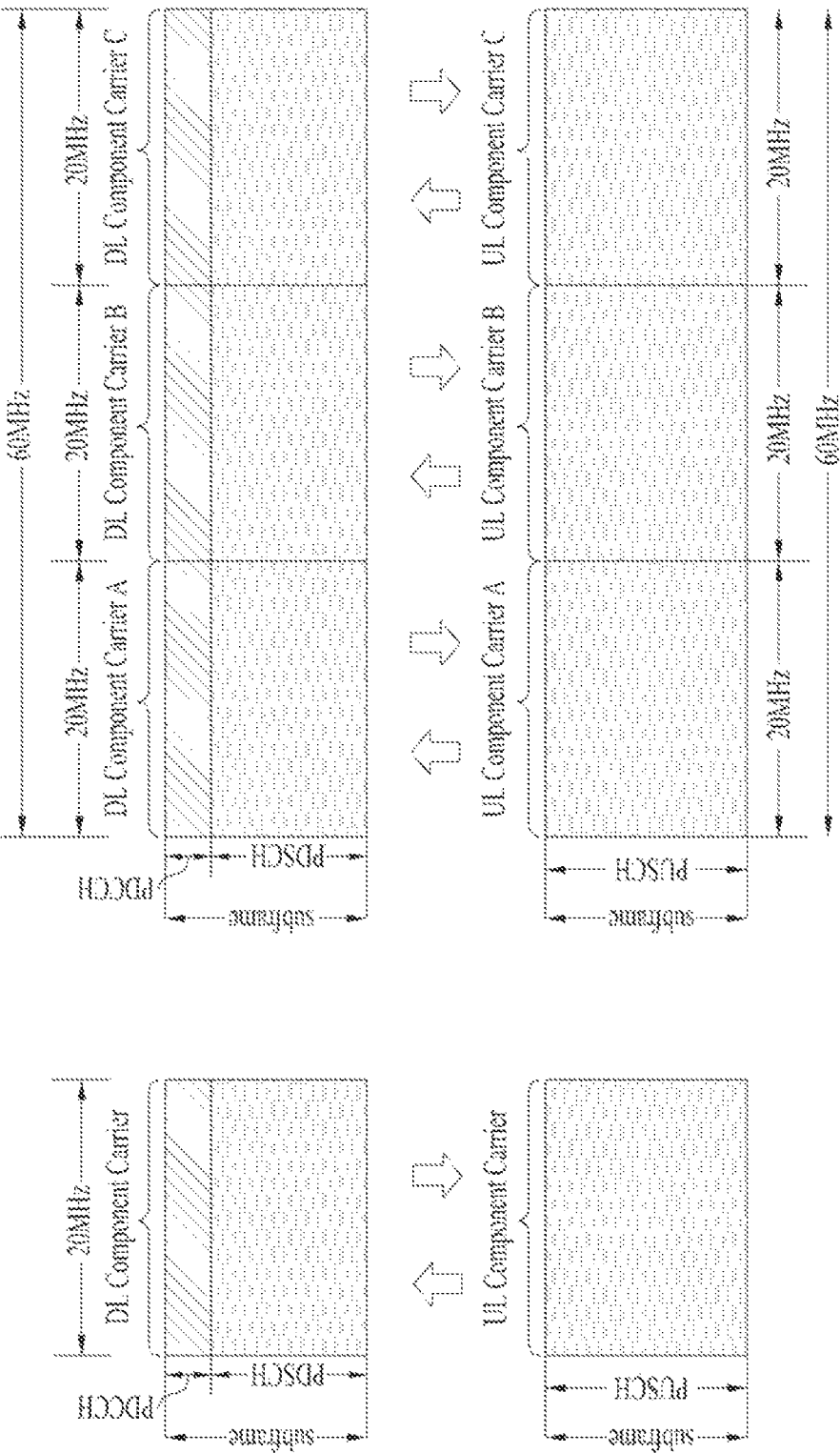
FIG. 6 is a diagram for one example of component carriers of LTE system and carrier aggregation used by LTE-A system.

FIG. 6 is a diagram for one example of component carriers of LTE system and carrier aggregation used by LTE-A system.

FIG. 6 (a) shows a single carrier structure used by LTE system. Component carriers include DL CC and UL CC. One component carrier may have a frequency range of 20 MHz.

FIG. 6 (b) shows a carrier aggregation structure used by LTE-A system. Referring to FIG. 6 (b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, $L \leq M \leq N$) to a user equipment. In doing so, the user equipment may be able to monitor the limited M DL CCs only and receive DL signals. Moreover, a network may be able to assign primary DL CC to the user equipment in a manner of prioritizing L DL CCs (where, $L \leq M \leq N$). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relationship between a DL/UL CC for carrying HARQ data and a UL/DL CC for carrying HARQ ACK/NACK signal.

2. 2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured.

In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 7:
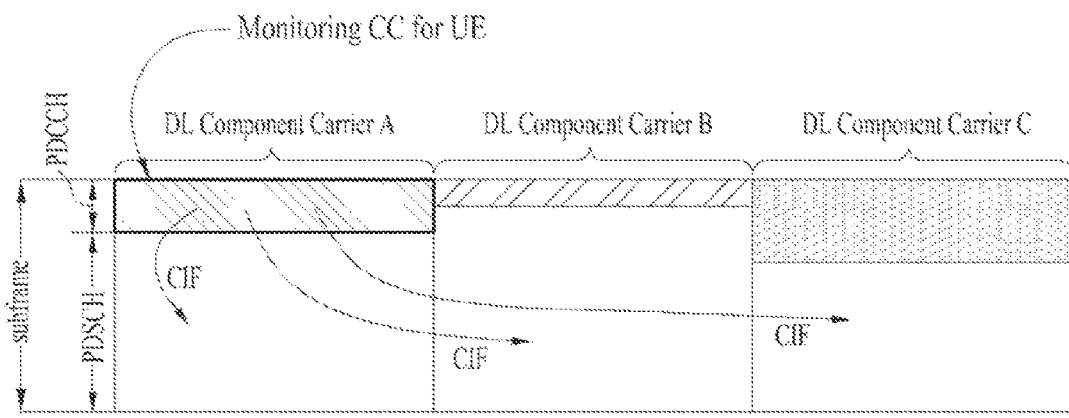
FIG. 7 is a diagram for a subframe structure of LTE-A system in accordance with cross carrier scheduling.

FIG. 7 is a diagram for a subframe structure of LTE-A system in accordance with cross carrier scheduling.

Referring to FIG. 7, a DL subframe for an LTE-A user equipment represents a case that 3 DL CCs are combined and that DL CC 'A; is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

3. The General of Uplink/Downlink Scheduling in TDD System 3. 1. Uplink[Downlink Configuration in TDD System In the frame structure type 2, UL-DL (uplink-downlink) configuration indicates that all subframes are assigned to (or reserved for) UL and DL by a prescribed rule. Table 9 shows UL-DL configuration.

TABLE 9

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 9, in each subframe of a radio frame, 'ID' indicates a subframe for DL transmission, 'U' indicates a subframe for UL transmission, and 'S' indicates a special subframe constructed with 3 kinds of fields including DwPTS, GP and UpPTS. UL-DL configurations may be classified into 7 types. And, the respective configurations differ from each other in the positions or number of DL subframes, special frames and UL subframes.

A point of switching DL to UL or a point of switching UL to DL is called a switching point. Switch-point periodicity means a period in which a switching operation between UL and DL subframes is identically repeated and supports both 5 ms and 10 ms. In case of the 5 ms DL-UL switch-point periodicity, a special subframe (S) exists in every half-frame. In case of the 10 ms DL-UL switch-point periodicity, a special subframe (S) exists in a $1^{st}$ half-frame only.

In all configurations, $0^{th}$ subframe, $5^{th}$ subframe and DwPTS are the intervals provided for the DL transmission only. UpPTS and a subframe directly contiguous with a special subframe are the intervals for the UL transmission.

The above-mentioned UL-DL configuration may be known to both a base station and a user equipment. The base station is able to inform the user equipment of the change of the UL-DL assigned state of a radio frame in a manner of transmitting an index of configuration information each time UL-DL configuration information is changed. The configuration information is a sort of DL control information and can be transmitted on PDCCH (physical downlink control channel), which is a DL control channel, like other scheduling information. Moreover, the configuration information is a broadcast information and can be commonly transmitted to all user equipments in a cell on a broadcast channel. In the TDD system, the number of half-frames included in a radio frame, the number of subframes included in the half-frame and the combination of DL and UL subframes are just exemplary.

3. 2. Uplink/Downlink Scheduling in TDD System

Since DL/UL subframe configuration in TDD system differs per UL-DL configuration, PUSCH and PHICH transmission times are set different in accordance with the configuration. And, transmission times of PUSCH and PHICH may be configured different in accordance with an index (or number) of a subframe.

In LTE system, UL/DL timing relations among PUSCH, PDCCH ahead of the PUSCH and PHICH for carrying DL HARQ ACK/NACK corresponding to the PUSCH are determined in advance.

Table 10 shows a transmission timing of PDCCH and PUSCH corresponding to the PDCCH per UL-DL configuration.

TABLE 10

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | | 4 | | | 6 | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | 7 | 7 | | | | 5 |

Referring to Table 10, in case of UL-DL configurations 1 to 6, when a UL grant is received on PDCCH from a base station in $n^{th}$ DL subframe or a retransmission should be performed after reception of PHICH, a user equipment transmits PUSCH in $(n+k)^{th}$ UL subframe corresponding to an index of the DL subframe having the PDDCH (or PHICH) transmitted therein. In this case, a value of 'k' follows Table 10.

In case of a UL-DL configuration 0, a PUSCH transmission may be performed by Table 10 in accordance with an $I_{PHICH}$ value determined by a value of a UL index in a UL DCI format, a PHICH transmitted UL subframe number and a UL subframe number of a UL subframe received by an upper layer or used to transmit PUSCH, performed in $(n+7)^{th}$ UL subframe, or performed in both of the UL subframe according to Table 10 and the $(n+7)^{th}$ subframe.

Meanwhile, if a user equipment receives PHICH including HARQ ACK/NACK in a DL subframe i from a base station, the corresponding PHICH corresponds to PUSCH transmitted in a UL subframe (i–k) by the user equipment.

Table 11 shows a transmission timing relationship between PUSCH and PHICH corresponding to the PUCCH per UL-DL configuration.

TABLE 11

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | 6 | | | 4 | | 6 |
| 2 | | | 6 | | | | 6 | | | |
| 3 | 6 | | | | | | | 6 | 6 | |
| 4 | | | | | | | | 6 | 6 | |
| 5 | | | | | | | 6 | | | |
| 6 | 6 | 4 | | | 7 | 4 | | | 6 | |

Referring to Table 11, in case of UL-DL configurations 1 to 6 or in case of a UL-DL configuration 0 and $I_{PHICH}$=0, if a user equipment receives PHICH carrying HARQ-ACK from a base station in a subframe i, the PHICH corresponds to PUSCH transmitted by the user equipment in a subframe (i–k). On the other hand, in case of the UL-DL configuration 0 and $I_{PHICH}$=1, if a user equipment receives PHICH carrying HARQ-ACK from a base station in a subframe i, the PHICH corresponds to PUSCH transmitted by the user equipment in a subframe (i–6).

After a user equipment has transmitted a transport block in a PUSCH subframe corresponding to a DL subframe i, if PHICH corresponding to the transport block is received in the DL subframe i and ACK is then decoded, or if the transport block is disabled by PDCCH transmitted in the DL subframe i, the user equipment forwards the ACK corresponding to the transport block to an upper layer. Otherwise, NACK for the transport block is forwarded to the upper layer.

In aspect of a user equipment, an ACK/NACK response (or PHICH) to a UL transmission on PUSCH of the user equipment in $n^{th}$ UL subframe is transmitted from a base station in $(n+k)^{th}$ DL subframe corresponding to a corresponding UL subframe index. In case of subframe bundling, a corresponding PHICH corresponds to a last subframe of a bundle. The user equipment should search for, detect and demodulate the corresponding PHICH by estimating that the PHICH response to the OUSCH transmitted by the user equipment is transmitted from the base station in the $(n+k)^{th}$ DL subframe. In this case, a value of k follows Table 12.

Table 12 shows a transmission timing relationship between PUSCH and PHICH corresponding to the PUCCH per UL-DL configuration.

TABLE 12

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

PHICH resource is identified by such an index pair as $(n_{PHICH}^{group}, n_{PHICH}^{seq})$. In this case, $n_{PHICH}^{group}$ indicates a PHICH group number and $n_{PHICH}^{seq}$ indicates an orthogonal sequence index in a corresponding PHICH group. The $n_{PHICH}^{group}$ and $n_{PHICH}^{seq}$ can be found by Formula 3.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH} \quad \text{[Formula 3]}$$

In Formula 3, the $n_{DMRS}$ is mapped from a cyclic shift for a DMRS (demodulation reference signal) field in a latest PDCCH having a UL DCI format for a transport block related to a corresponding PUSCH transmission. On the other hand, when a PDCCH having a UL DCI format for the same transport block is absent, if an initial PUSCH for the same transport block is scheduled semi-persistently or by a random access response grant signal, the $n_{DMRS}$ is set to 0.

The $N_{SF}^{PHICH}$ indicates a size of a spreading factor used for PHICH modulation.

The $I_{PRB\_RA}$ is equal to $I_{PRB\_RA}^{lowest\_index}$ if it is a $1^{st}$ transport block of PUSCH related to PDCCH or the number of transport blocks passively recognized in case of absence of a related PDCCH is not equal to the number of transport blocks indicates by a latest PDCCH related to the corresponding PUSCH. On the other hand, in case of a $2^{nd}$ transport block of PUSCH related to a PDCCH, the $I_{PRB\_RA}$ is equal to $I_{PRB\_RA}^{lowest\_index}+1$. In this case, the $I_{PRB\_RA}^{lowest\_index}$ corresponds to a lowest PRB index of a $1^{st}$ slot of a corresponding PUSCH transmission.

The $N_{PHICH}^{group}$ indicates a number of a PHICH group configured by an upper layer.

The $I_{PHICH}$ is set to 1 if PUSCH is transmitted in a subframe index 4 or a subframe index 9 in the UL-DL configuration 0. Otherwise, the $I_{PHICH}$ is set to 0.

Table 13 shows the mapping relationship between a cyclic shift for a DMRS field used to determine PHICH resource in PDCCH having a UL DCI format and $n_{DMRS}$.

TABLE 13

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

4. Downlink Control Information Transceiving Method

Machine-type communication (hereinafter abbreviated MTC) means that each user equipment performs communication with a base station or the communications are performed among a plurality of user equipments. An MTC device means a user equipment designed for communication with an MTC server through a PLMN (public land mobile network) and/or communication with other MTC device(s) for MTC. The MTC device communicates with MTC server(s) and/or other MTC device(s) and is able to communicate with an entity, which provides raw data to be processed to the MTC device, using a wireless (e.g., PAN (personal area network) communication or a hardwired communication locally.

Within a single cell boundary, data communications through the above-configured MTC are widely performed, numerous user equipments can be located, and periodicity of data transmission and a size of transmitted data can be configured differently due to the properties of the respective user equipments (e.g., a refrigerator, a washer, a mobile phone, a TV, a laptop, etc.). In aspect of implementation of user equipments, the properties of the user equipments are sorted by categories as shown in Table 14 to design the respective user equipments.

Table 14 shows performance of a user equipment required for each category.

Recently, MTC requires a design cost reduction and a complexity reduction in association with a small data size, a restricted mobility and/or the above-mentioned low-cost device categories. These devices are required for the distribution and of MTC and the efficient management of MTC.

Meanwhile, as mentioned in the foregoing description, a user equipment performs blind decoding to acquire downlink control information by receiving PDCCH. According to the blind decoding, channel decoding is performed on all CCEs in the PDCCH per aggregation level and a DCI format transmitted to the user equipment is detected through a CRC check. And, the user equipment attempts the blind decoding on all DCI formats that should be monitored.

In case of a carrier aggregation environment non-supportive system (i.e., non-CA based system), a user equipment performs 12 channel decodings in a common search space (CSS) and 32 channel decodings in a UE-specific search space (USS) on a single subframe, thereby receiving DL resource allocation (DL assignment) and UL resource allocation (UL grant) transmitted to itself. In a carrier aggregation environment supportive system (i.e., CA based system), '44+[32×(# of DL SCC)]+[16×(# of UL MIMO CC]' blind decodings depending on the number of downlink secondary component carriers (SCC) and the number of UL-MIMO configured uplink component carriers (CC).

Hence, as the number of component carriers set for a user equipment increases, the blind decoding count increases linearly to work as a burden on implementation of the user equipment. In doing so, the blind decoding in a non-CA based system may work in a manner similar to complexity of turbo decoding. The above-mentioned blind decoding count may be determined based on the three factors as follows.

1) Total number of CCE aggregation levels to be necessarily monitored: CCE aggregation level is determined depending on a code rate for a reliable PDCCH transmission. Since it may affect a successful PDCCH decoding, it is difficult to restrict a CCE aggregation level to decrease the blind decoding count.

TABLE 14

| | Downlink | | | | | Uplink | | |
|---|---|---|---|---|---|---|---|---|
| UE category | Max. data Rate (DL/UL) (Mbps) | Max. # DL-SCH TB bits/ TTI | Max. # DL-SCH Bits/TB/ TTI | Total soft Channel bits | Max. # spatial layers | Max. # UL-SCH TB bits/ TTI | Max. # UL-SCH Bits/TB/ TTI | Support For 64 QAM |
| Category 1 | 10/5 | 10296 | 10296 | 250368 | 1 | 5160 | 5160 | No |
| Category 2 | 50/25 | 51024 | 51024 | 1237248 | 2 | 25456 | 25456 | No |
| Category 3 | 100/50 | 102048 | 75376 | 1237248 | 2 | 51024 | 51024 | No |
| Category 4 | 150/50 | 150752 | 75376 | 1827072 | 2 | 51024 | 51024 | No |
| Category 5 | 300/75 | 299552 | 149776 | 3667200 | 4 | 75376 | 75376 | Yes |
| Category 6 | 300/50 | [299552] | [TBD] | [3667200] | * | [51024] | [TBD] | No |
| Category 7 | 300/150 | [299552] | [TBD] | [TBD] | * | [150752/ 102048 (Up to RAN4)] | [TBD] | Yes/No (Up to RAN4) |
| Category 8 | 1200/600 | [1200000] | [TBD] | [TBD] | * | [600000] | [TBD] | Yes |

Referring to Table 14, UE (user equipment) category 1 consists of user equipments for a case that a required data rate is small. These user equipments do not support multi-input multi-output (MIMO) and can be designed with low costs using a simple reception algorithm having a buffer or memory in small size. On the other hand, since a high data rate is required in case of UE category 8, these user equipments support MIMO and need a buffer or memory in a big size, thereby requiring expensive parts for the corresponding designs.

2) Total number of PDCCH candidates to be necessarily monitored: If the total number of PDCCH candidates is restricted, it can become a method of reducing a blind decoding count using one form of subdivision of a search space of component carriers. Yet, it may increase possibility of PDCCH blocking.

3) Total number of DCI formats to be necessarily decoded: DCI format size adaptation is one of methods of decreasing a blind decoding count. On the assumption that a DCI format size is adapted, a DCI format is transmitted in a common search space. In case that a carrier-specific search space is defined, the DCI format size adaptation may not be advantageous in viewpoint of decreasing a blind decoding count.

As mentioned in the foregoing description, decreasing a blind decoding count may become a key factor in implementing low-cost devices in MTC. Therefore, a method of decreasing a count of blind decodings according to the present invention is provided to implement a low-cost device.

Figure 8:
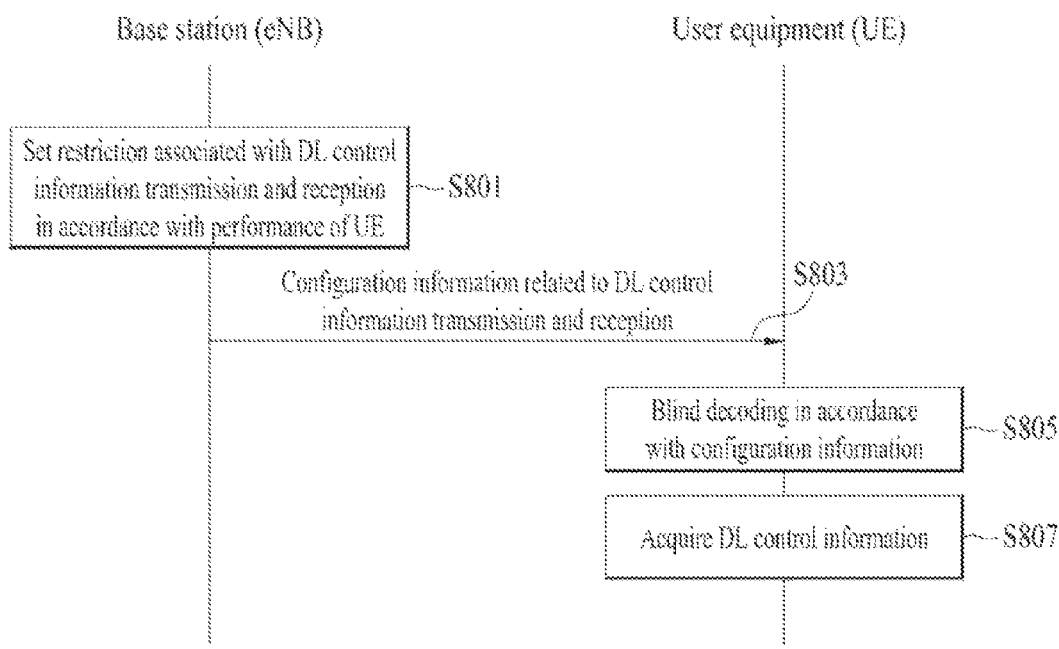
FIG. 8 is a diagram for a method of receiving a downlink control information according to one embodiment of the present invention.

FIG. 8 is a diagram for a method of receiving a downlink control information according to one embodiment of the present invention.

Referring to FIG. 8, a base station (eNB) sets up restrictions in association with transmission and reception of DL control information in accordance with performance of a user equipment (UE) [S801]. In particular, if the performance of the user equipment checked in the step S801 belongs to a specific category shown in Table 14 described in the foregoing description or is lower than that of the specific category, the base station sets up restrictions in association with the transmission and reception of the downlink control information to enable the corresponding user equipment to receive the DL control information appropriately. In doing so, it is able to determine the performance of the user equipment using threshold values preset in association with parameters indicating the performance of the user equipment in Table 14.

The user equipment receives information configured in association with transmission and reception of the DL control information in accordance with the performance of the corresponding user equipment through an upper layer signaling, a broadcast message, a message in the course of negotiation and the like from the base station [S803]. In doing so, the base station can check capacity/performance of the user equipment through the upper layer signaling transmitted from the user equipment and is also able to check the performance of the user equipment through a process for negotiation with the user equipment.

In this case, the configuration information related to the transmission and reception of the downlink control information may include information on a range of aggregation level of CCE used for the transmission of the downlink control information, information on the number of PDCCH candidates per CCE aggregation level, information on a range of a transmission mode set for the user equipment, information on a range of a resource allocation type set for the user equipment, information on a DCI format transmitted in each search space, information on a range of DCI format transmitted to the user equipment and the like. Thus, a method of restricting an existing configuration in association with transmission and reception of downlink control information to implement a low-cost user equipment, and more particularly, to decrease a blind decoding count shall be described in detail in (4. 1) to (4. 8).

Moreover, the information restrictively configured in association with the downlink control information may be configured between the base station and the user equipment in advance. In this case, the above-mentioned steps S801 to S803 may be skipped.

In order to search for the PDCCH transmitted from the base station, the user equipment performs blind decoding [S803] and then acquires the transmitted downlink control information from the found PDCCH [S805]. In this case, the user equipment may be able to perform the blind decoding in accordance with the restrictions configured in association with the transmission and reception of the downlink control information mentioned in the foregoing description.

In the following description, methods of reducing implementation burden required for the blind decoding in order for an MTC user equipment to acquire PDCCH by decreasing a blind decoding count to implement the MTC user equipment of low costs are explained. The methods described in (4. 1.) to (4. 7.) may be independently applicable or at least one of them may be used in a manner of being combined together. For clarity of the following description of an embodiment of the present invention, a low-cost device shall be commonly named 'MTC user equipment', by which the present invention may be non-limited.

4. 1. CCE Aggregation Level Restriction

Existing user equipments perform blind decoding per CCE aggregation level in accordance with a common search space or a UE-specific search space.

Table 15 shows an existing CCE aggregation level in accordance with a search space.

TABLE 15

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In order to implement an MTC user equipment, it is able to decrease a blind decoding count by restricting a CCE aggregation level. Through this restriction method, it is able to make modification to perform blind decoding on a portion of an existing CCE aggregation level, as shown in Table 16.

Table 16 shows one example of restricting a CCE aggregation level.

TABLE 16

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| Common | 4 | 16 | 4 |

Referring to Table 16, a CCE aggregation level can be restricted to 4 in a common search space, while a CCE aggregation level can be restricted to 1 or 2 in a UE-specific search space. In particular, a user equipment monitors a common search space on a CCE aggregation level 4 and also monitors a UE-specific search space on each of CCE aggregation level 1 and CCE aggregation level 2. Eventually, in a common search space of CCE aggregation level 4, the user equipment performs blind decoding on 4 PDCCH candidates. Moreover, the user equipment attempts the blind decoding on 6 PDCCH candidates in a UE-specific search space on CCE aggregation level 1 and also attempts the blind decoding on 4 PDCCH candidates in a UE-specific search space on CCE aggregation level 2.

Yet, the proposed scheme can restrict both a common search space and a UE-specific search space into a specific CCE aggregation level like the above-mentioned example or may restrict either the common search space or the UE-specific search space into a specific CCE aggregation level. And, it is a matter of course that restriction into a different CCE aggregation level can be put on each search space like the example shown in Table 16.

4. 2. Restriction on the Number of PDCCH Candidates

In order to implement an MTC user equipment, it is able to decrease a blind decoding count by transmitting PDCCH to the corresponding user equipment in a manner of setting the number of PDCCH candidates to a small number.

The number of PDCCH candidates, on which blind decoding is performed per CCE aggregation level in each search space by an existing user equipment, is shown in Table 15. Yet, in order to decrease the blind decoding count of the MTC user equipment, it is able to decrease the number of PDCCH candidates. Through this method, it is able to set the number of PDCCH candidates for each CCE aggregation level to a half, as shown in Table 17.

Table 17 shows one example of restricting the number of PDCCH candidates.

TABLE 17

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 3 |
| | 2 | 12 | 3 |
| | 4 | 8 | 1 |
| | 8 | 16 | 1 |
| Common | 4 | 16 | 2 |
| | 8 | 16 | 1 |

Referring to FIG. 17, it is able to set the total number of PDCCH candidates, on which a user equipment performs blind decoding per CCE aggregation level in each search space, to a half.

In case that a search space is configured as shown in Table 17, a search space according to the restricted PDCCH candidates can be determined by Formula 4. In particular, a user equipment regulates a search space by Formula 4 and is then able to perform blind decoding.

$$L\{(Y_k+m')\bmod \lfloor N_{CCE,k}/L\rfloor\}+i \quad \text{[Formula 4]}$$

In Formula 4, the $N_{CCE,k}$ means the total number of CCEs in a control region of a $k^{th}$ subframe. The i indicates an index for designating an individual CCE to each PDCCH candidate, where i=0, . . . (L−1). The L indicates an aggregation level and L∈{1,2,4,8}.

In case of a common search space, m'=m, where m=0, . . . $M^{(L)-1}$. And, the $M^{(L)}$ indicates the number of PDCCH candidates according to CCE aggregation level L to be monitored in a search space. In case of a UE-specific search space, in a PDCCH monitored serving cell, if a carrier indicator filed (CIF) is set for a monitoring user equipment, it is m'=m+$M^{(L)}$·$n_{CI}$. In this case, the no indicates a carrier indicator field value. On the contrary, if the carrier indicator field is not set, it is m'=m. In particular, if an MTC user equipment does not support a carrier aggregation (CA) environment, the MTC user equipment regulates a search space by Formula 5 and is then able to perform blind decoding.

$$L\{(Y_k+m)\bmod \lfloor N_{CCE,k}/L\rfloor\}+i \quad \text{[Formula 5]}$$

In Formula 4 and Formula 5, in case of a common search space, the $Y_k$ is set to 0 for 2 aggregation levels 'L=4' and 'L=8'. On the other hand, for an aggregation level L, in case of a UE-specific search space, $Y_k$ is defined as Formula 6.

$$Y_k=(A\cdot Y_{k-1})\bmod D \quad \text{[Formula 6]}$$

In Formula 6, it is $Y_{-1}=n_{RNTI}\ne 0$. And, an RNTI value used for $n_{RNTI}$ may follow the definition in 3GPP LTE/LTE-A system. Moreover, A=39827, D=65537, and k=$\lfloor n_s/2 \rfloor$. In this case, the $n_s$ indicates a slot number (or index) in a radio frame.

Meanwhile, the proposed scheme can restrict the number of PDCCH candidates into a half of an existing number, by which the present invention may be non-limited. And, it is a matter of course that the number of PDCCH candidates can be restricted into the number of PDCCH candidates different from those shown in Table 17. For instance, the number of PDCCH candidates can be restricted at a different rate (e.g., ⅓, etc.) or can be restricted into a specific number previously set between a base station and a user equipment.

4. 3. Transmission Mode Restriction

In case of a user equipment in 3GPP LTE-A Rel-10 system, the user equipment can have transmission modes shown in Table 18 and receives a DCI format according to a transmission mode set for the user equipment.

Table 18 shows a transmission mode and a DCI format according to the corresponding transmission mode.

TABLE 18

| Transmission mode | DCI format to be monitored |
|---|---|
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Closed-loop spatial multiplexing | DCI 0/1A, DCI 2 |
| 5. Multi-user MIMO | DCI 0/1A, DCI 1D |
| 6. Closed-loop Rank = 1 precoding | DCI 0/1A, DCI 1B |
| 7. Single-layer beamforming; port 5 | DCI 0/1A, DCI 1 |
| 8. Dual-layer beamforming; port 7, 8 | DCI 0/1A, DCI 2B |
| 9. Multi-layer beamforming; port 7~14 | DCI 0/1A, DCI 2C |

Yet, in case of an MTC user equipment, transmission and reception of a small data size can be required. And, a receiving chipset of a low cost or a design of a simple structure is targeted. Hence, a physical antenna for MIMO transmission/reception may not be used. In particular, since restriction may be put on transmitting/receiving antennas in comparison with those of an existing user equipment, a transmission of the MTC user equipment may be restricted, whereby a corresponding DCI format may be restricted.

For instance, the transmission mode of the MTC user equipment may be limited to a case that the number of antenna is 1, as shown in Table 19, and a DCI format used for the corresponding case may be restrictively configured.

Table 19 shows one example of a restricted transmission mode and a DCI format corresponding to the restricted transmission mode.

TABLE 19

| Transmission mode | DCI format to be monitored |
|---|---|
| 1. Single-antenna port; port 0 | DCI 0/1A, DCI 1 |

Moreover, referring to Table 20 in the following, such a transmission mode, which relatively facilitates implementation of a receiving end and raises a received SNR (signal to noise ratio), as transmit diversity, closed-loop rank=1 precoding and a single-layer beamforming may be applied together.

Table 20 shows another example of a restricted transmission mode and a corresponding DCI format.

TABLE 20

| Transmission mode | DCI format to be monitored |
| --- | --- |
| 1. Single-antenna port; port 0 | DCI 0/1A, DCI 1 |
| 2. Transmit diversity | DCI 0/1A, DCI 1 |
| 6. Closed-loop Rank = 1 precoding | DCI 0/1A, DCI 1B |
| 7. Single-layer beamforming; port 5 | DCI 0/1A, DCI 1 |

Thus, if the restricted transmission mode is applied, since a corresponding user equipment does not expect a transmission mode associated with multi-antenna and a corresponding DCI format, its implementation can be further facilitated. For example, in case that a user equipment receives a DCI format 2, 2A, 2B or 2C, definition and implementation of a procedure for the case becomes unnecessary.

Meanwhile, the proposed scheme may restrict the transmission mode into the modes like the above example, by which the present invention may be non-limited. And, it is a matter of course that the proposed scheme can restrict the transmission modes can be restricted into modes different from those shown in Table 19 or Table 20.

4. 4. Resource Allocation Type Restriction

Resource allocation (RA) of PDSCH in 3GPP LTE/LTE-A Rel-8, -9 and -10 systems include type 0, type 1 and type 2. And, a DCI format expected to receive by a user equipment according to each resource allocation type is shown in Table 21.

Table 21 shows a DCI format according to each resource allocation type.

TABLE 21

| RA Type | DCI format |
| --- | --- |
| RA Type 0 | 1, 2, 2A, 2B, 2C |
| RA Type 1 | 1, 2, 2A, 2B, 2C |
| RA Type 2 | 1A, 1B, 1C, 1D |

On the other hand, by restricting a resource allocation type used for an MTC user equipment, it is able to decrease a blind decoding count of the MTC user equipment. In particular, the resource allocation type may be restricted to use one of resource allocation types 0, 1 and 2 only. Moreover, since the resource allocation type 0 and the resource allocation type 1 use the same DCI, the resource allocation type 0 and the resource allocation type 1 can be fixed to be used.

In particular, referring now to Table 18, as mentioned in the foregoing description, since the DCI format 0 and the DCI format 1A have the same size, a user equipment can perform blind decoding for two DCI formats per transmission mode. Yet, in case that the resource allocation type is fixed to 0 or 1 or that the resource allocation type is fixed to 2, a DCI format transmitted to a user equipment in a UE-specific search space may be fixed to a single type. Since the user equipment can eventually perform the blind decoding for a single DCI format only, it is able to decrease a blind decoding count into a half.

Table 22 shows one example of a restricted resource allocation type and a corresponding DCI format.

TABLE 22

| Transmission mode | DCI format to be monitored |
| --- | --- |
| 1. Single-antenna port; port 0 | DCI 1 |
| 2. Transmit diversity | DCI 1 |

TABLE 22-continued

| Transmission mode | DCI format to be monitored |
| --- | --- |
| 3. Open-loop spatial multiplexing | DCI 2A |
| 4. Closed-loop spatial multiplexing | DCI 2 |
| 5. Multi-user MIMO | DCI 1D |
| 6. Closed-loop Rank = 1 precoding | DCI 0/1A or DCI 1B |
| 7. Single-layer beamforming; port 5 | DCI 1 |
| 8. Dual-layer beamforming; port 7, 8 | DCI 2B |
| 9. Multi-layer beamforming; port 7~14 | DCI 2C |

Referring to Table 22, one example of a case that a resource allocation type is fixed to 0 or 1 is shown. Hence, a DCI format transmitted to an MTC user equipment in a UE-specific search space can be fixed to 1. Yet, in case of transmission mode 6, since a DCI format consisting of a resource allocation type 2 only is used, the corresponding case may be processed exceptionally like Table 22. Eventually, since a DCI format transmitted in the UE-specific search space is fixed to 1 (except transmission mode 6), it is able to decrease a blind decoding count in the UE-specific search space into a half. Moreover, uplink resource allocation information can be always transmitted in a common search space.

Besides, like Table 23 and Table 24 in the following, MIMO transmission and reception of an MTC user equipment are restricted and a resource allocation type can be fixed to 2.

Table 23 shows one example of a restricted transmission mode, a resource allocation type and a corresponding DCI format.

TABLE 23

| Transmission mode | DCI format to be monitored |
| --- | --- |
| 1. Single-antenna port; port 0 | DCI 0/1A |
| 2. Transmit diversity | DCI 0/1A |
| 6. Closed-loop Rank = 1 precoding | DCI 0/1A or DCI 1B |
| 7. Single-layer beamforming; port 5 | DCI 0/1A |

Table 24 shows one example of a restricted transmission mode, a resource allocation type and a corresponding DCI format.

TABLE 24

| Transmission mode | DCI format to be monitored |
| --- | --- |
| 1. Single-antenna port; port 0 | DCI 0/1A |

In this case, uplink resource allocation (UL grant) and downlink resource allocation (DL assignment) can be transmitted in a common search space or UE-specific search space.

Thus, by restricting both a transmission mode and a resource allocation type, it is able to decrease a blind decoding count of an MTC user equipment and facilitate implementation of the MTC user equipment with low costs.

4. 5. Search Space Restriction

In order to implement an MTC user equipment, it is able to restrict a search space in which a DCI format is transmitted. In particular, it is able to restrict a transmitted search space for each DCI format. And, it is able to restrict a transmission in either a common search space or a UE-specific search space for all DCI formats.

In particular, an uplink resource allocation (UL grant) can be transmitted in a common search space only and a DCI format corresponding to each transmission mode can be transmitted in a UE-specific common space only. Moreover, if a base station transmits DCI 1A without transmitting a DCI format corresponding to a transmission mode during a predetermined interval due to such as reason as a poor channel status and the like, it can be called a DCI 1A fallback. In case of an MTC user equipment, if such a DCI 1A fallback is restricted, it can be represented as Table 25.

Table 25 shows one example of restricting a DCI format transmitted search space.

TABLE 25

| Transmission mode | DCI format to be monitored | |
|---|---|---|
| | CSS (UL grant) | USS (DL assignment) |
| 1. Single-antenna port; port 0 | DCI 0 | DCI 1 |
| 2. Transmit diversity | DCI 0 | DCI 1 |
| 3. Open-loop spatial multiplexing | DCI 0 | DCI 2A |
| 4. Closed-loop spatial multiplexing | DCI 0 | DCI 2 |
| 5. Multi-user MIMO | DCI 0 | DCI 1D |
| 6. Closed-loop Rank = 1 precoding | DCI 0 | DCI 1B |
| 7. Single-layer beamforming; port 5 | DCI 0 | DCI 1 |
| 8. Dual-layer beamforming; port 7, 8 | DCI 0 | DCI 2B |
| 9. Multi-layer beamforming; port 7~14 | DCI 0 | DCI 2C |

Referring to Tale 25, DCI formats are discriminated from each other by search spaces with reference to an uplink resource allocation (UL grant) and a downlink resource allocation (DL assignment).

On the other hand, search spaces can be discriminated from each other, which is shown in Table 26.

Table 26 shows one example of restricting a DCI format transmitted search space.

TABLE 26

| Transmission mode | DCI format to be monitored | |
|---|---|---|
| | CSS (DL assignment) | USS (UL grant) |
| 1. Single-antenna port; port 0 | DCI 1A | DCI 0 |
| 2. Transmit diversity | DCI 1A | DCI 0 |
| 3. Open-loop spatial multiplexing | DCI 1A | DCI 0 |
| 4. Closed-loop spatial multiplexing | DCI 1A | DCI 0 |
| 5. Multi-user MIMO | DCI 1A | DCI 0 |
| 6. Closed-loop Rank = 1 precoding | DCI 1A | DCI 0 |
| 7. Single-layer beamforming; port 5 | DCI 1A | DCI 0 |
| 8. Dual-layer beamforming; port 7, 8 | DCI 1A | DCI 0 |
| 9. Multi-layer beamforming; port 7~14 | DCI 1A | DCI 0 |

Referring to Table 26, a downlink resource allocation (DL assignment) is transmitted through a common search space and an uplink resource allocation (UL grant) is transmitted through a UE-specific search space, for example.

Moreover, it is able to restrict a transmission of a DCI format in one of a common search space and a UE-specific common space.

Table 27 shows another example of restricting a DCI format transmitted search space.

TABLE 27

| Transmission mode | DCI format to be monitored | |
|---|---|---|
| | CSS | USS (DL assignment) (UL grant) |
| 1. Single-antenna port; port 0 | — | DCI 0/1A, DCI 1 |
| 2. Transmit diversity | — | DCI 0/1A, DCI 1 |
| 3. Open-loop spatial multiplexing | — | DCI 0/1A, DCI 2A |
| 4. Closed-loop spatial multiplexing | — | DCI 0/1A, DCI 2 |
| 5. Multi-user MIMO | — | DCI 0/1A, DCI 1D |
| 6. Closed-loop Rank = 1 precoding | — | DCI 0/1A, DCI 1B |
| 7. Single-layer beamforming; port 5 | — | DCI 0/1A, DCI 1 |
| 8. Dual-layer beamforming; port 7, 8 | — | DCI 0/1A, DCI 2B |
| 9. Multi-layer beamforming; port 7~14 | — | DCI 0/1A, DCI 2C |

Referring to Table 27, one example of restricting a common search space is shown. Both a downlink resource allocation (DL assignment) and an uplink resource allocation (UL grant) can be transmitted through a UE-specific search space.

Thus, as the number of DCI formats expected or monitored by a user equipment is decreased by restricting a DCI format transmitted search space, it is able to decrease a blind decoding count of the corresponding user equipment.

4. 6. DCI Format Restriction

In order to implement an MTC user equipment, it is able to restrict a DCI format transmitted to the corresponding user equipment. For instance, in order to decrease a blind decoding count in a common search space of the MTC user equipment, it may not perform a group power control. In particular, this may mean that DCI formats 3 and 3A scrambled on CRC with TPC-PUCCH-RNTI or TPC-PUSCH-RNTI are not transmitted to corresponding user equipments or may mean that the corresponding user equipments do not monitor the DCI format 3 and the DCO format 3A. Therefore, the DCI format, which should be monitored by the MTC user equipment in a common search space, may be limited to the DCI format 0/1A. Eventually, since the DCI format 0 and the DCI format 1A have the same payload size, the corresponding user equipment can acquire an uplink resource allocation (UL grant) or a downlink resource allocation (DL assignment) by one blind decoding in the common search space.

4. 7. Blind Decoding Restriction During SPS (Semi-Persistent Scheduling) Session In order to implement an MTC user equipment, in case of the MTC user equipment, it is able to restrict blind decoding during the SPS session. In particular, if the MTC user equipment is activated, it is able to restrict a blind decoding not to be performed in a subframe belonging to the SPS session until the MTC user equipment is deactivated (or released). Therefore, the corresponding user equipment can reduce a power for the blind decoding in the subframe of the SPS session.

4. 8. Example of Application

As mentioned in the foregoing description, at least one of the methods mentioned in the description of (4. 1.) to (4. 7.) can be combined with each other.

In the following description, one example of using the methods in (4. 1.) to (4. 6.) in a manner of combining the methods together is explained.

First of all, when an MTC user equipment does not support a carrier aggregation (CA) environment, let's look into a count of blind decoding performed by an existing user equipment to acquire a DCI format. In case of a common search space, the blind decoding is performed 12 times [i.e., # of PDCCH candidates per CCE aggregation level×# of different DCI format payload sizes, i.e., (4+2)×2]. In case of a UE-specific search space, the blind decoding is performed 32 times [i.e., # of PDCCH candidates per CCE aggregation level×# of different DCI format payload sizes, i.e., (6+6+2+2)×2]. Thus, the blind decoding is performed total 44 times.

In this case, if the method proposed in (4. 1.) is applied, a blind decoding count can be decreased. In doing so, although Table 16 is assumed as applied, it is a matter of course that a different CCE aggregation level can be restricted. In this case, looking into a count of blind decodings performed by a user equipment to acquire a DCI format, in case of a common search space, the blind decoding is performed 8 times [i.e., # of PDCCH candidates per CCE aggregation level×# of different DCI format payload sizes, i.e., 4×2]. In case of a UE-specific search space, the blind decoding is performed 24 times [i.e., # of PDCCH candidates per CCE aggregation level×# of different DCI format payload sizes, i.e., (6+6)×2]. Thus, the blind decoding is performed total 32 times.

Based on this, if the method proposed in (4. 2.) is applied, a blind decoding count can be further decreased. In doing so, although Table 17 is assumed as applied, it is a matter of course that a CCE aggregation level can be restricted differently. In this case, looking into a count of blind decodings performed by a user equipment to acquire a DCI format, in case of a common search space, the blind decoding is performed 4 times [i.e., # of PDCCH candidates per CCE aggregation level×# of different DCI format payload sizes, i.e., 2×2]. In case of a UE-specific search space, the blind decoding is performed 12 times [i.e., # of PDCCH candidates per CCE aggregation level×# of different DCI format payload sizes, i.e., (3+3)×2]. Thus, the blind decoding is performed total 16 times.

Based on this, if the method proposed in (4. 3.) is applied, implementation can be further facilitated because a transmission mode associated with multi-antenna and a corresponding DCI format are not expected.

Based on this, if the method proposed in (4. 4.) or (4. 5.) is applied, a blind decoding count can be further decreased. In particular, since a DCI format detected from a UE-specific search space is fixed to 1 kind, the blind decoding count can be further decreased. In this case, looking into a count of blind decodings performed by a user equipment to acquire a DCI format, in case of a common search space, the blind decoding is performed 4 times [i.e., # of PDCCH candidates per CCE aggregation level×# of different DCI format payload sizes, i.e., 2×2]. In case of a UE-specific search space, the blind decoding is performed 6 times [i.e., # of PDCCH candidates per CCE aggregation level×# of different DCI format payload sizes, i.e., (3+3)×1]. Thus, the blind decoding is performed total 10 times.

Based on this, if the method proposed in (4. 6.) is applied, a blind decoding count can be further decreased. In particular, since a DCI format detected from a UE-specific search space is fixed to 1 kind, the blind decoding count can be further decreased. In this case, looking into a count of blind decodings performed by a user equipment to acquire a DCI format, in case of a common search space, the blind decoding is performed 2 times [i.e., # of PDCCH candidates per CCE aggregation level×# of different DCI format payload sizes, i.e., 2×1]. In case of a UE-specific search space, the blind decoding is performed 6 times [i.e., # of PDCCH candidates per CCE aggregation level×# of different DCI format payload sizes, i.e., (3+3)×1]. Thus, the blind decoding is performed total 8 times.

5. The General of Device for Implementing the Present Invention

Figure 9:
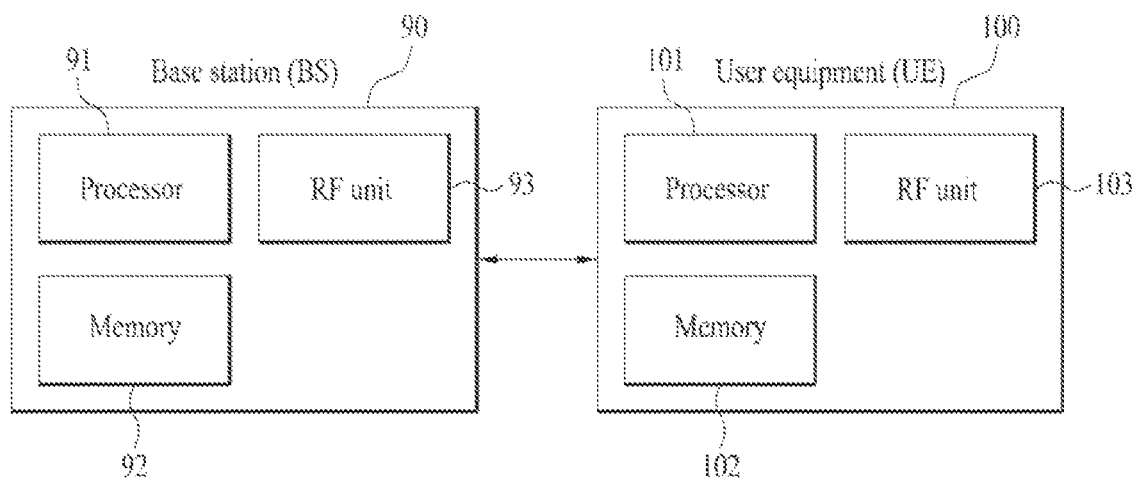
FIG. 9 is a block diagram for one example of a configuration of a wireless communication device according to one embodiment of the present invention.

FIG. 9 is a block diagram for a configuration of a wireless communication device according to one embodiment of the present invention.

Referring to FIG. 9, a wireless communication system may include a base station BS 90 and a plurality of User equipments 100 located within an area of the base station 90.

The base station 90 may include a processor 91, a memory 92 and an RF (radio frequency) unit 93. The processor 91 implements the proposed functions, processes and/or methods. Layers of a radio interface protocol can be implemented by the processor 91. The memory 92 is connected with the processor 91 and then stores various kinds of information to drive the processor 91. The RF unit 93 is connected with the processor 91 and then transmits and/or receives radio signals.

The User equipment 100 includes a processor 101, a memory 102 and an RF unit 103. The processor 101 implements the proposed functions, processes and/or methods. Layers of a radio interface protocol can be implemented by the processor 101. The memory 102 is connected with the processor 101 and then stores various kinds of information to drive the processor 101. The RF unit 103 is connected with the processor 101 and then transmits and/or receives radio signals.

The memory 92/102 may be provided within or outside the processor 91/101. And, the memory 92/102 may be connected with the processor 91/101 via various kinds of well-known means. Moreover, the base station 90 and/or the User equipment 100 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a data transceiving method in a wireless access system according to the present invention is described with reference to examples applied to 3GPP LTE system, it may be applicable to various kinds of wireless access systems as well as the 3GPP LTE system.

What is claimed is:

1. A method of a user equipment (UE) receiving downlink control information (DCI) in a wireless access system, the method comprising:
performing blind decoding according to a transmission mode set for the UE in a search space assigned to the UE; and
receiving the DCI via a physical downlink control channel (PDCCH) identified by the blind decoding,
wherein the set transmission mode is one of a plurality of transmission modes supported by a base station (BS) that are restricted according to performance of the UE, and
wherein the blind decoding is performed using only half of total M control channel elements (CCE) aggregation levels for the search space, when the UE performs a machine type communication (MTC), where M corresponds to '4' or '2'.

2. The method of claim 1, wherein:
performing the blind decoding comprises using a format of the DCI according to a resource allocation type set for the UE; and
the resource allocation type is set to one of a plurality of resource allocation types supported by the BS according to the performance of the UE.

3. The method of claim 1, wherein the search space is set to either a UE-specific search space or a common search space according to the performance of the UE.

4. The method of claim 1, wherein the DCI is transmitted according to a format of the DCI in either a UE-specific search space or a common search space.

5. The method of claim 1, wherein performing the blind decoding comprises using only formats of a plurality of Das supported by the BS that are restricted according to the performance of the UE.

6. The method of claim 1, wherein the blind decoding is performed via candidates among a plurality of candidates of the PDCCH configuring the search space that are restricted according to the performance of the UE.

7. A user equipment (UE) receiving downlink control information (DCI) in a wireless access system, the UE comprising:
an RF unit configured to transceive radio signals; and
a processor configured to:
perform blind decoding according to a transmission mode set for the UE in a search space assigned to the UE, and
control the RF unit to receive the DCI via a physical downlink control channel (PDCCH) identified by the blind decoding,
wherein the set transmission mode is one of a plurality of transmission modes supported by a base station (BS) that are restricted according to performance of the UE, and
wherein the blind decoding is performed using only half of total M control channel elements (CCE) aggregation levels for the search space, when the UE performs a machine type communication (MTC), where M corresponds to '4' or '2'.

8. The user equipment of claim 7, wherein:
performing the blind decoding comprises using a format of the DCI according to a resource allocation type set for the UE; and
the resource allocation type is set to one of a plurality of resource allocation types supported by the BS according to the performance of the UE.

9. The user equipment of claim 7, wherein the search space is set to either a UE-specific search space or a common search space according to the performance of the UE.

10. The user equipment of claim 7, wherein the DCI is transmitted according to a format of the DCI in either a UE-specific search space or a common search space.

11. The user equipment of claim 7, wherein performing he blind decoding comprises using only formats of a plurality of Das supported by the BS that are restricted according to the performance of the UE.

12. The user equipment of claim 7, wherein the blind decoding is performed via candidates among a plurality of candidates of the PDCCH configuring the search space that are restricted in accordance with the performance of the UE.

* * * * *